United States Patent [19]

Beck et al.

[11] Patent Number: 5,146,547
[45] Date of Patent: Sep. 8, 1992

[54] PRINTER BUFFER AND RASTERIZATION ARRANGEMENT

[75] Inventors: James L. Beck, Versailles; James R. Booth, Nicholasville; Carl P. Cole; Lynn M. Oliver, both of Lexington; Warren J. Spina; Stephen R. Troyer, both of Lexington, all of Ky.

[73] Assignee: Lexmark International, Inc., Greenwich, Conn.

[21] Appl. No.: 790,101

[22] Filed: Nov. 7, 1991

Related U.S. Application Data

[63] Continuation of Ser. No. 399,632, Aug. 28, 1989, abandoned.

[51] Int. Cl.[5] ............................................. G06K 15/00
[52] U.S. Cl. ...................................... 395/116; 395/115
[58] Field of Search ............... 395/101, 115, 116, 114, 395/164-166; 346/150, 154; 358/296, 444; 400/61

[56] References Cited

U.S. PATENT DOCUMENTS 4,516,139  3/1985  Tackigucki ........................ 358/296

Primary Examiner—Arthur G. Evans
Attorney, Agent, or Firm—John J. McArdle, Jr.

[57] ABSTRACT

A page printer (101) which rasterizes a page utilizing partial page bit map swaths. Received data to be printed is stored in packets (12-17) in a page buffer in random access memory (105). Data within each packet is arranged in printing order down the page to be printed, but the packets themselves are arranged in the order received, and are not indexed or linked. As each swath (11) is rasterized, each packet is examined, and packets containing data falling at least in part within the active swath are processed. The printer is controlled by a programmed microprocessor, and logic hardware assistance is provided for translating data addresses from logical addresses (54) to physical addresses (52). Logic hardware assistance is also provided for making the determination of whether or not a given data address lies within the active swath.

6 Claims, 11 Drawing Sheets

PRINTER BUFFER AND RASTERIZATION ARRANGEMENT

This application is a continuation of application Ser. No. 399,632, filed Aug. 28, 1989, now abandoned.

FIELD OF THE INVENTION

The invention is disclosed particularly in relation to page printers in which input data is received and stored for rasterization and printing. The invention is concerned with the form of storage of data for printing and the manner of rasterization of stored data into a partial page bit map.

BACKGROUND OF THE INVENTION

Printers receive input data from a source such as a computer and produce printed output based upon the input data. Usually, the input data is stored in some form, at least temporarily, in the printer prior to printing. The input data may be modified to form the stored data, or the stored data may be modified in the course of producing a printed output.

In a page printer, for example, stored data is used to produce a data bit representation of a page to be printed (during rasterization) and the bit data image of the page is then moved to a print mechanism for physical printing (during serialization). In an electrophotographic laser page printer, the serialized bit data modulates a laser beam swept across a photoconductor.

In the case of input text data, rasterization usually involves copying bit images of characters from character fonts into a bit map memory to produce the bit data representation of the desired page. Representations of the characters to be rasterized are held in a page buffer which is formatted in some fashion to facilitate rasterization.

In a page printer lacking sufficient memory for storing a bit map of an entire page to be printed, a swathing architecture is employed. In a swathing architecture, a page in the page buffer to be printed is rasterized into a series of contiguous raster line blocks referred to as swaths. Rasterization is accomplished iteratively, rasterizing a portion of the page into each swath as the swath is made available until the entire page has been completed.

The processes of formatting input data into the page buffer, rasterizing the page into the bit map memory, and printing the bit map onto paper must be accomplished with good performance and reliability. Most commonly these processes are carried out by a microprocessor in a page printer controller. In addition, many page printers use circuitry to provide hardware assistance to increase the effectiveness of the microprocessor. For example, serialization is handled almost entirely by hardware in many page printers, using direct memory access concepts and techniques. Further, rasterization may be assisted by electronic logic that allows the microprocessor to write data into the bit map memory as a set of bit fields that are variable in size and placement within the bit map. These bit fields are different from normal memory "words" in that the bit fields are dynamic in size and their placement is variable relative to a bit boundary, as opposed to the normal byte, word or double word boundary. Further, data from fonts may be combined with existing contents of the bit map (usually by means of a logical OR function) to produce overlay and other printing features.

If a full page bit map is available, input data may be formatted and fully rasterized into the bit map before initiating serialization and printing. In a swathing environment, the page data is stored in the page buffer, but rasterization must occur "on the fly", swath by swath during the printing process. This requires speed and efficiency of rasterization if acceptable printing speeds are to be maintained.

In the past, in swathing printers, page buffer data is stored in an ordered fashion so that the microprocessor is able to rasterize the bit map swaths by moving through the page buffer contents in an ordered sequence. The position of characters and the like relative to the page is maintained in a linked list, a form of index, that is accessed by the microprocessor to perform rasterization.

When rasterizing a character, the printer controller must determine the position on the page where the character is to be placed and if this position is within the swath of the page which is being rasterized. If the desired position is within the active swath, the controller must compute the physical address in memory for this position and transfer the font data for the character to the swath. If the character is not completely rasterized in the active swath, the controller must maintain an indication for that character so that in the next swath a further portion of the character is rasterized.

As can be appreciated, speed in storing input data and performing rasterization is essential to maintaining the throughput of a printer of the foregoing type. The throughput of the printer depends in part upon the rate of serialization of page bit map data to the print mechanism. In a swathing environment, rasterization must keep ahead of serialization to avoid a page complexity fault, so that the rate of serialization directly affects the required rate of rasterization. If a single controller resource, such as a microprocessor, is utilized not only for some or all of the rasterization process but also in accumulating data in a suitable format in the page buffer, the page buffer storage efficiency is also important.

It is the general aim of the present invention to provide an improved page buffer and rasterization arrangement in printers of the foregoing type.

SUMMARY OF THE INVENTION

This objective has been accomplished in accordance with one aspect of the invention by providing a printer in which input data to be printed is stored in the form of "packets", without indexing, where the data within each packet is in printing order but the packets themselves are in the order received, which typically is not the printing order.

In accordance with another aspect of the invention, this objective is accomplished by providing a page printer where input data is stored in packets of the foregoing type and partial page bit map swaths are rasterized in printing order by rasterizing the data from each of the packets which is made up, at least in part, of data lying within the swath being rasterized.

In the exemplary printer to be described hereinafter, the controller for the printer includes a microprocessor performing part of the functions of storing data in a page buffer and rasterizing the page buffer data into a swath bit map memory. In this printer, the microprocessor is assisted by logic circuitry in placing bit data in the active bit map swath and in determining what characters or other information lie in a swath being rasterized.

In the particular printer described, there are also provisions for assisting the microprocessor in writing font data to the swath. The disclosed printer also includes the capability of providing the logic circuit assistance to the microprocessor without regard to the size of the bit map swaths.

Additional advantages of the invention, and the manner of their implementation, will become apparent upon reading the following detailed description and upon reference to the drawings in which:

DESCRIPTION OF THE PREFERRED EMBODIMENT

Figure 1:
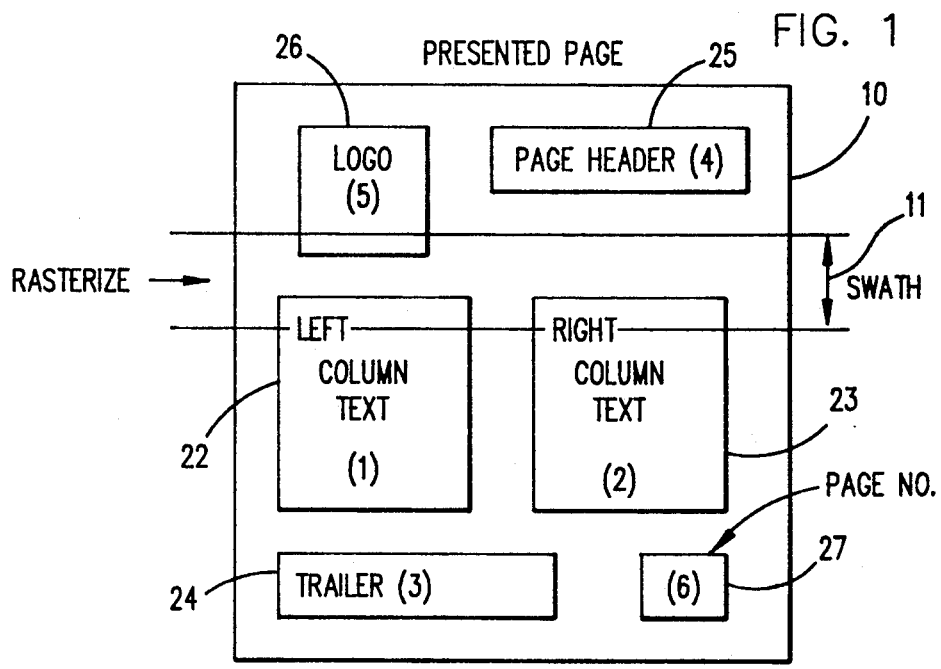
FIG. 1 is a diagrammatic illustration of the effect in the page buffer of rasterization of one swath of a page to be printed.
Figure 1:
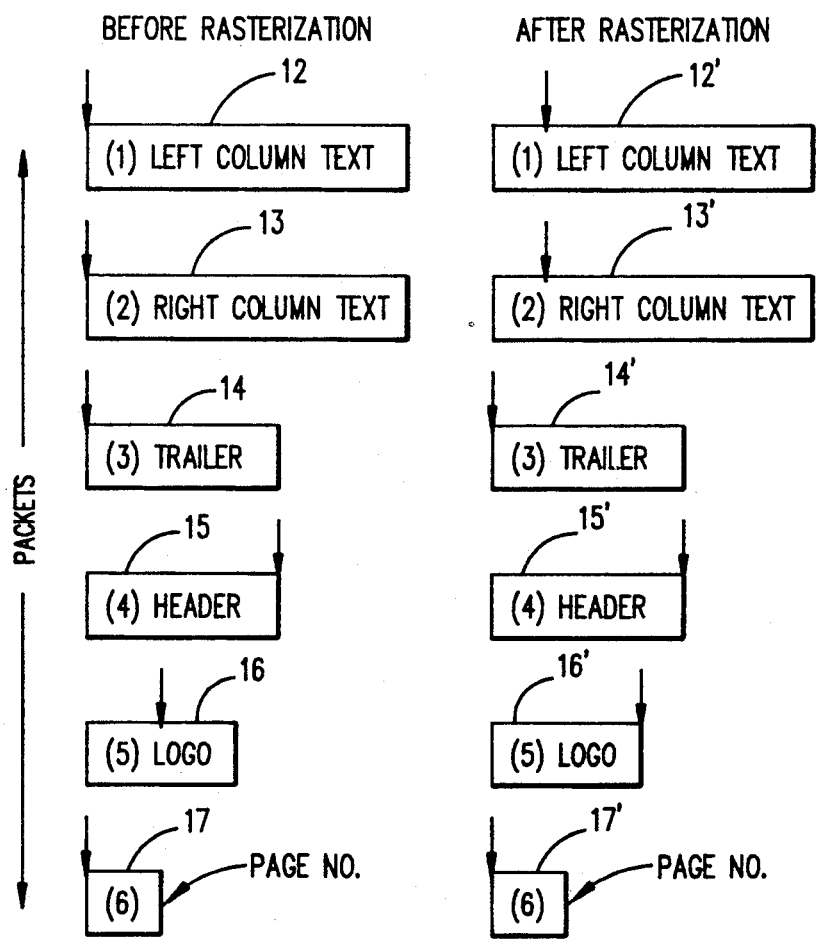

While the invention is susceptible to various modifications and alternative forms, a specific embodiment thereof has been shown by way of example in the drawings and will herein be described in detail. It should be understood that it is not intended to limit the invention to the particular form disclosed, but the intention is to cover all modifications and alternatives falling within the spirit and scope of the invention as defined by the appended claims.

With initial reference to FIG. 1, a page 10 is arranged in the form in which it is presented to the print mechanism in a printer during serialization and in which it is subsequently reproduced on paper. The page 10 is not present in bit map memory in its entirety but is represented sequentially in a series of swaths of bit map memory proceeding from the top of the page to the bottom. In the illustrated page 10, a swath 11 is being rasterized. A swath above the swath 11 is at the time of rasterization of the swath 11 being serialized to the print mechanism, and swaths below the swath 11 have not yet been rasterized.

The contents of the page 10 are left column text 22, right column text 23, a trailer 24, a page header 25, a logo 26, and a page number 27. In accordance with one aspect of the present invention, these six printed areas of the page are stored in a page buffer in the order in which they are received by the printer as separate packets of data in the page buffer.

The left column text is stored in a packet 12, the right column text in a packet 13, the trailer in a packet 14, the header in a packet 15, the logo in a packet 16, and the page number in a packet 17. The numbers in parentheses in the packets and in the data areas on the page indicate the order in which the packets were received by the printer.

The packets 12-17 are arranged in the page buffer, one following another, in the order received from a host computer or other data source. The efficiency of packet formation from the data stream is improved from that of a linked list since there is no sorting of the input data. The data is placed into packets in the same order as it is received from the datastream; and a current packet is closed and a new one opened whenever the datastream causes one of the packet termination rules to be invoked. This approach takes advantage of the fact that much of the data for a page to be printed arrives at the printer in an orderly or sequential fashion although groups of data may be placed anywhere on the page.

A packet is terminated, in the case of text data for example, if the character font changes, if the character mode (such as bold, double wide, double high, or emphasize) changes, or if there is any upward movement of the location of characters on the page.

Image data received by the printer is also packetized. The image data is organized before being placed into a packet, typically into a raster scan format. A packet of image data is terminated if there is a change in the resolution of the image data or upward movement on the page.

With reference again to FIG. 1, the first input data received by the printer is for the text of the left column on the page 10. This text is received line by line, moving down the page to the end of the left column information. The next information received is for the top of the right column of text 23. This information is stored in a new packet since the direction of movement from the bottom of the left column to the top of the right column is upward on the page. A packet 13 is opened for the right column text which proceeds downward on the page. The next input data received is for a trailer 24, which is in a different type font. Although the movement from the right column text to the trailer is downward on the page, the change in font calls for the closing of the packet 13 and the opening of a new packet 14 in the page buffer. The trailer information is placed in this packet. Next, when data is received for the page header 25, the upward movement on the page calls for the closing of the packet 14 and the opening of a new packet 15. The header information is then followed by a logo image 26. The movement from the end of the page header 25 to the beginning of the logo 26 is upward on the page, and also is a change in data type. This calls for the closing of the header packet 15 and the opening of a logo packet 16 in the page buffer. In the present instance, the printer stores the logo in a raster scan format. After the storage of the contents of the logo, the next data received is for a page number 27. Since this is a change in data type from image data to text data, the packet 16 for the logo is closed, and a new packet 17 is opened for the page number. At the completion of the storage of the page number packet 17, with the receipt of an indication that the page is completed, the packet 17 is closed.

In FIG. 1, the manner in which the printer controller rasterizes the packet data into a swath is shown in exemplary form. Before the rasterization of the swath 11, the packets 12-17 have associated pointers illustrated diagrammatically by arrows pointing to different portions of the packets which indicate whether some, all or none of the packet has been rasterized. The status of the pointers after the rasterization of the swath 11 are shown to the right of the packets 12-17 for packets now designated 12'-17' The printer controller need only rasterize data from packets lying at least in part within the swath being rasterized. The controller identifies the packet 15 which has been fully rasterized and the packets 14 and 17, which fall entirely below the swath 11. The relevant portions of the packets 16, 12 and 13 are rasterized into the swath 11.

After the rasterization of the swath 11, the packets 15' and 16' are now marked as fully rasterized (with the arrows pointing to the ends of the packets). The packets 12' and 13' are marked as being partially rasterized, while the packets 14' and 17' are marked as not having yet been rasterized. In practice, this information is maintained in packet headers, as shall be described.

Figure 2:
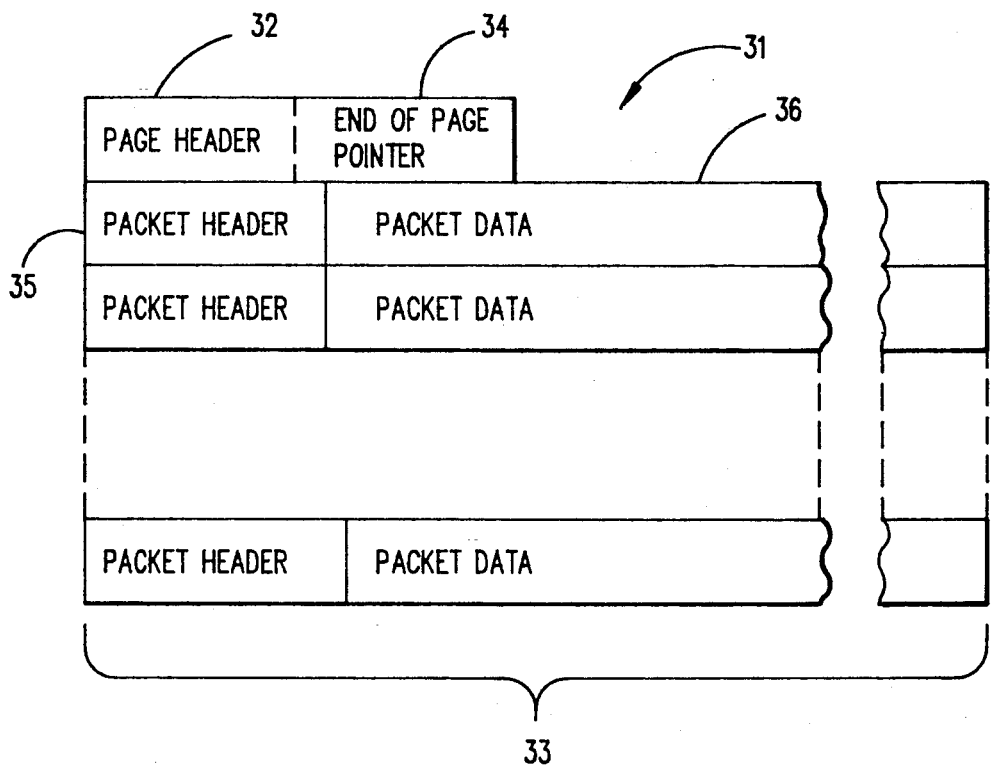
FIG. 2 is an illustration of the form of packets in the page buffer.

With reference now to FIG. 2, a page 31 stored in the page buffer includes a page header 32 and a number of packets such as 33. Pages 31 are stored one after another in the page buffer, and packets such as 33 are stored one after another within each page. The page header 32 includes an end of page pointer 34, which indicates the starting point in the page buffer for a subsequent page if there is one.

Each packet such as 33 includes a packet header 35 and usually includes packet data 36. The packet data is the information stored in the page buffer utilized in rasterizing the bit map swaths. The packet header includes certain identifying information concerning the contents and status of the packet. The packet header size may vary for different packet types. The header length for each packet type is a stored value. The packet data length is also stored in the packet header, as shall be described subsequently.

Figure 3:
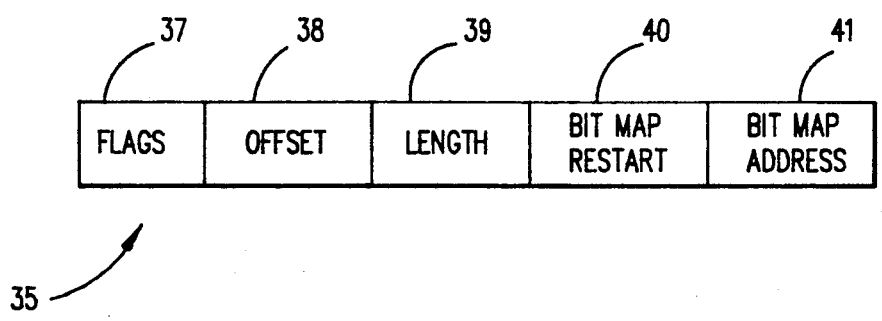
FIG. 3 is an illustration of the portions of a packet header.

With additional reference to FIG. 3, a packet header such as 35 includes flags 37, a packet offset value 38, a packet length value 39, a bit map restart address 40 and a bit map starting address 41.

The flags 37 in the packet header include flags for facilitating movement of the printer controller through the page buffer during rasterization. Included in the buffer navigation flags are an end of page marker and an end of buffer marker. Also included in the flags 37 are indications related to the packet type, including the header size and an identification of the packet, which may be, for example, a text packet or an image (all points addressable) packet. The packet flags may also include modifiers, such as indicating that a text packet includes text which is double high, double wide, emphasized, and so on.

The length field 39 in the packet header 35 contains an indication of the number of bytes of data in the packet, and the offset field 38 contains the starting point in the packet for data to be rasterized in the packet. Before a packet such as 33 has been rasterized in whole or in part, the offset is zero. When the packet has been fully rasterized, the offset equals the length.

The bit map address 41 is the logical address in the bit map of the page for the placement of the first data to be rasterized. The bit map restart address 40 is the address for the next data to be rasterized into the bit map.

The header fields for offset 38 and bit map restart 40 are dynamic and changeable in the course of rasterization. The fields for length 39 and the bit map address 41 are static and can be used to restore the offset and the bit map restart to the original values if a page is reprinted.

Figure 4:
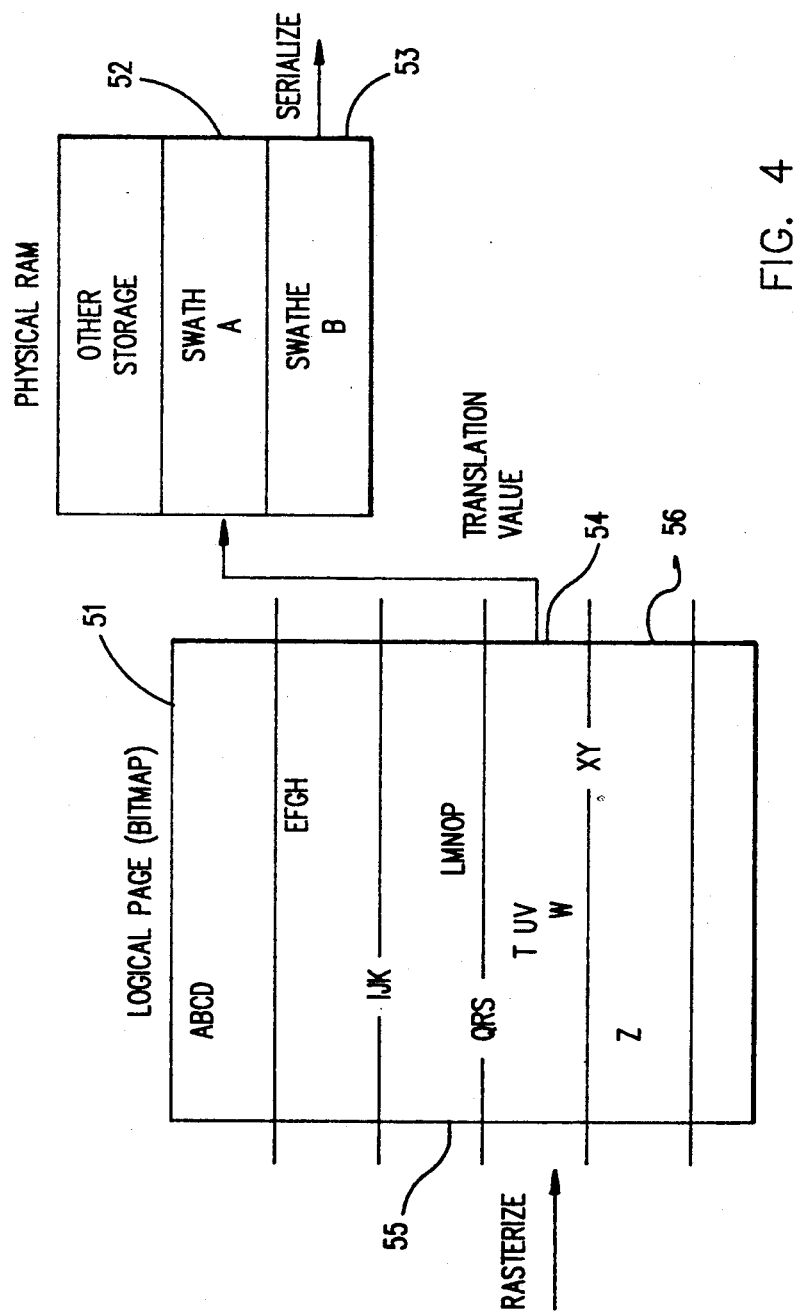
FIG. 4 is a diagrammatic illustration of the logical to physical address translation of the swaths of a page to be printed and the physical relationship of characters to swaths.

With additional reference now to FIG. 4, a page 51 is shown diagrammatically in bit map form and as the page is reproduced on paper. Note that the page 51 never actually exists in full in memory in a swathing architecture. The page 51 is represented at any given moment by a swath such as 54 which is being rasterized by the printer controller and a swath 55 which is being serialized. In accordance with an aspect of the invention, the microprocessor in the printer controller is assisted by logic hardware to translate logical bit map addresses in the swaths to physical dynamic RAM memory addresses so that the processor can deal in terms of logical page addresses while the swaths themselves remain at fixed addresses in the physical RAM.

To do this, the microprocessor provides the logic hardware with a memory address translation value for each swath as it is rasterized so that the hardware can place the data from that swath into the proper location in the physical RAM. For example, as the data for the swath 54 is rasterized, it is translated and written to the physical swath 52 in the RAM. The microprocessor need not move or translate bit data in the swath to the appropriate physical RAM locations. The swath 55, which was previously rasterized, is contained in the RAM in swath 53. While the swath 52 is being rasterized, the swath 53 is serialized to the print mechanism. When the swath 52 is serialized, the swath 56 in the logical page is rasterized and the bit data translated into the swath 53 in the physical RAM.

As can be seen in the logical page 51, some data falls across swath boundaries. For example, the text "QRS" between the swaths 54 and 55 must be partially rasterized into each of the two swaths. If the "QRS" is a packet, the offset 38 (FIG. 3) in the header for that packet is at a value to point to the character code for the letter "Q" at the start of rasterization of the swath 54.

Figure 5:
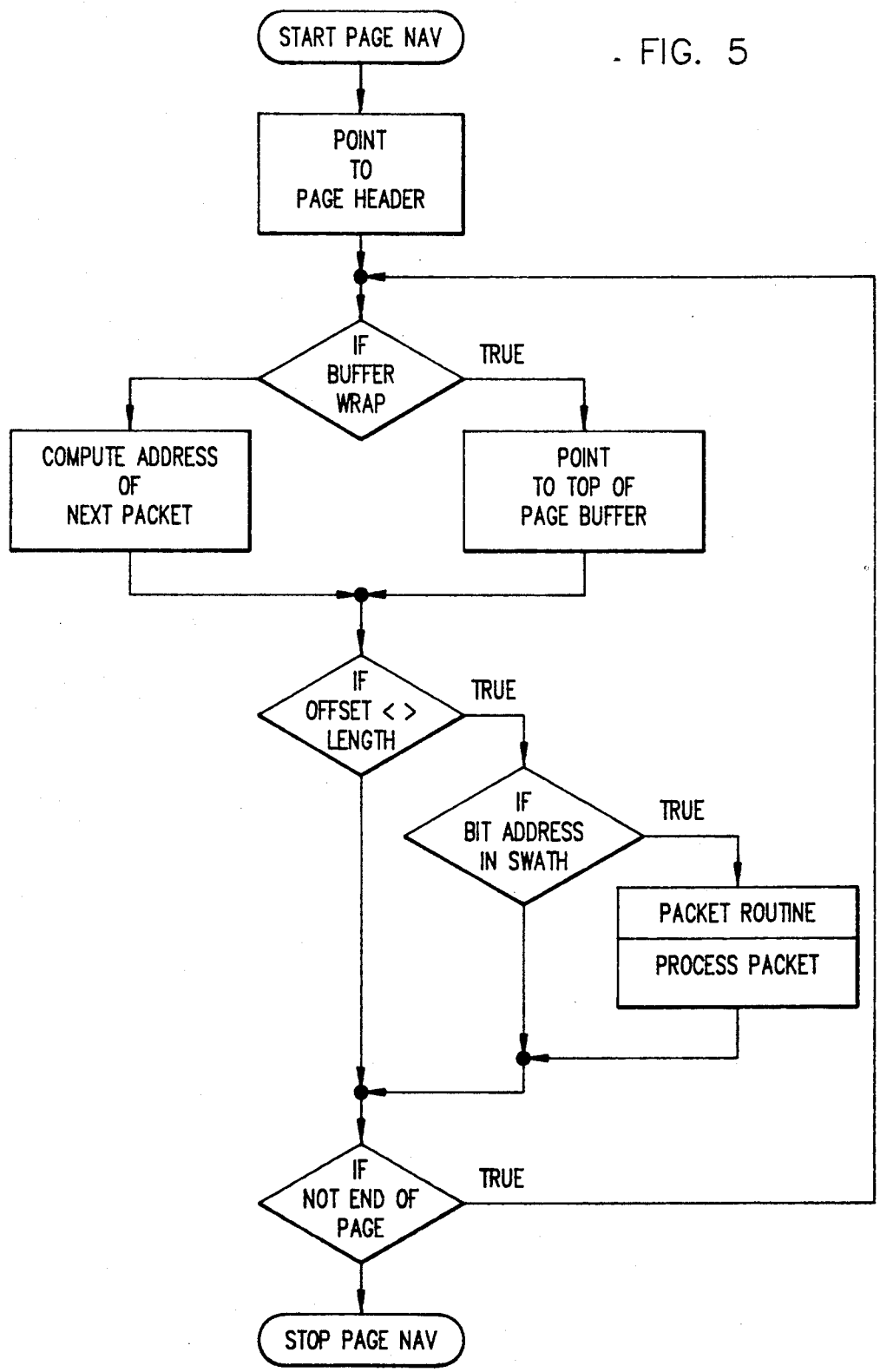
FIG. 5 is a flowchart of the operation of the microprocessor in the printer of FIG. 3 to rasterize a swath.

As the printer controller rasterizes each page, it moves down the page from swath to swath. For each swath which is processed, the controller microprocessor visits each packet of data for the page to determine if there is a contribution from that packet to the swath. This operation is shown in the flowchart of FIG. 5. In "navigating" through the packets of a page to rasterize a swath, the processor first examines the page header.

In the present printer, the page buffer data, on an inter-packet basis, can "wrap" from the bottom of the page buffer memory to the top. Therefore, the processor examines the page header to determine if a flag is set indicating that the balance of the page packets have wrapped to the beginning of the page buffer. If so, the processor moves to the top of the page buffer. If not, the processor moves to the address of the next packet. This address is determined from header information concerning the type of packet (the page header is a special type of packet), which determines the length of the header, combined with the length of the data portion of the packet (which in the case of a page header is zero).

The processor then determines what the offset value is in the packet addressed and if this offset is not equal to the length of the packet.

If the offset is equal to the length, this corresponds to the status of the packet 15 (FIG. 1), meaning that the packet has already been fully rasterized.

Figure 6A:
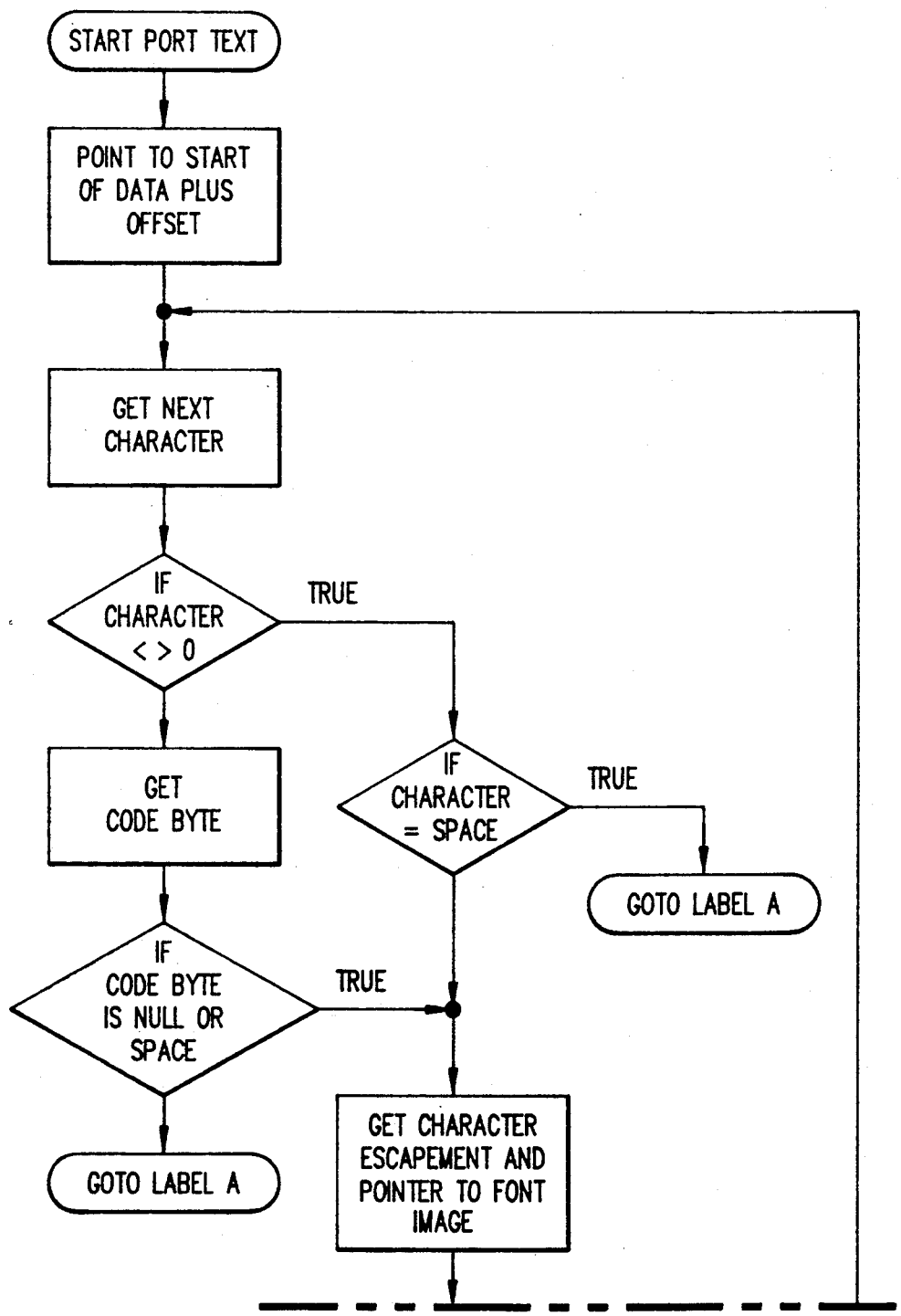
FIG. 6 (formed by joining FIGS. 6a and 6b at the dashed lines in figures, together with FIG. 6c which is related to FIGS. 6a and 6b through labels A, B and C) is a flowchart of the operation of the microprocessor and the printer in FIG. 3 to process a packet during rasterization.
Figure 6B:
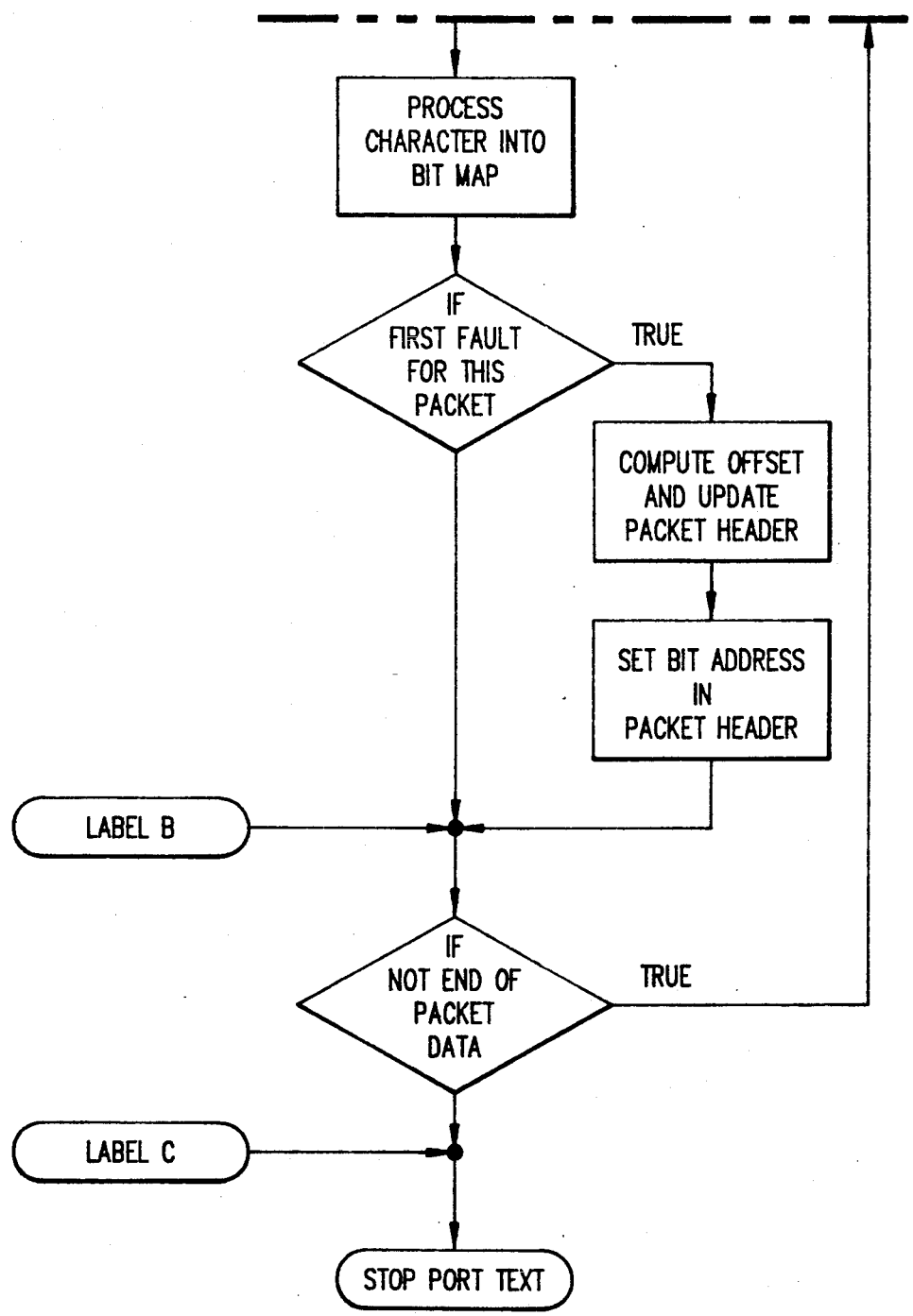

If the offset is not equal to the packet data length value, the processor next determines if the restart bit map address is in the swath being rasterized. The bit address of interest will either lie within the swath being rasterized or below it. If the restart address is not in the active swath, the packet is not processed. If the bit address is in the swath being rasterized, the packet is processed to place the appropriate data in the packet into the swath, as will be described in conjunction with the flowchart of FIG. 6.

After rasterization, or in the case that there is no data to be rasterized from the packet, the processor then determines if it has reached the last packet in the page. If not, the processor loops to check for buffer wrap and proceeds through the above-described sequence of steps. If the processor is at the end of the page, the rasterization of that swath has been completed.

To summarize, in storing input data in the page buffer, the printer microprocessor accepts data received in an orderly fashion as part of a single packet of data. These packets of page buffer data are stored in the order received and are not linked or indexed in any fashion. Then, at the time of rasterization, the processor examines each packet for each swath that is rasterized. Packets that have been fully rasterized already, and those which start below the active swath being rasterized, are disregarded; and the processor rasterizes the relevant parts of the other packets into the swath.

The principles of the invention may be applied to a variety of types of input data and to many rasterization approaches. A certain exemplary printer architecture shall now be described in somewhat more detail, with particular regard to the rasterization of input data in the form of text characters in coded form.

With reference now to FIG. 6, the rasterization of a packet of portrait text characters into a swath will be described. Portrait text refers to text characters which are not rotated from their stored font orientation in rasterizing the characters.

When the printer microprocessor in examining packets finds a packet in which the offset is not equal to the length of the packet data (the packet has not yet been fully rasterized) and where the restart bit map address is in the active swath (at least the initial restart address is not below the lower boundary of the active swath), the processor processes the packet as set forth in FIG. 6.

The processor first points (FIG. 6a) to the start of the data portion of the packet plus the amount at the offset (indicative of the amount of the page buffer data that has been fully rasterized previously). The processor then gets the next character from the packet data. At this point, if the character is a graphic character to be printed, it is rasterized into the bit map swath by copying the appropriate data from a character font. Otherwise, the character is a code, such as a movement code, to be processed.

Figure 6C:
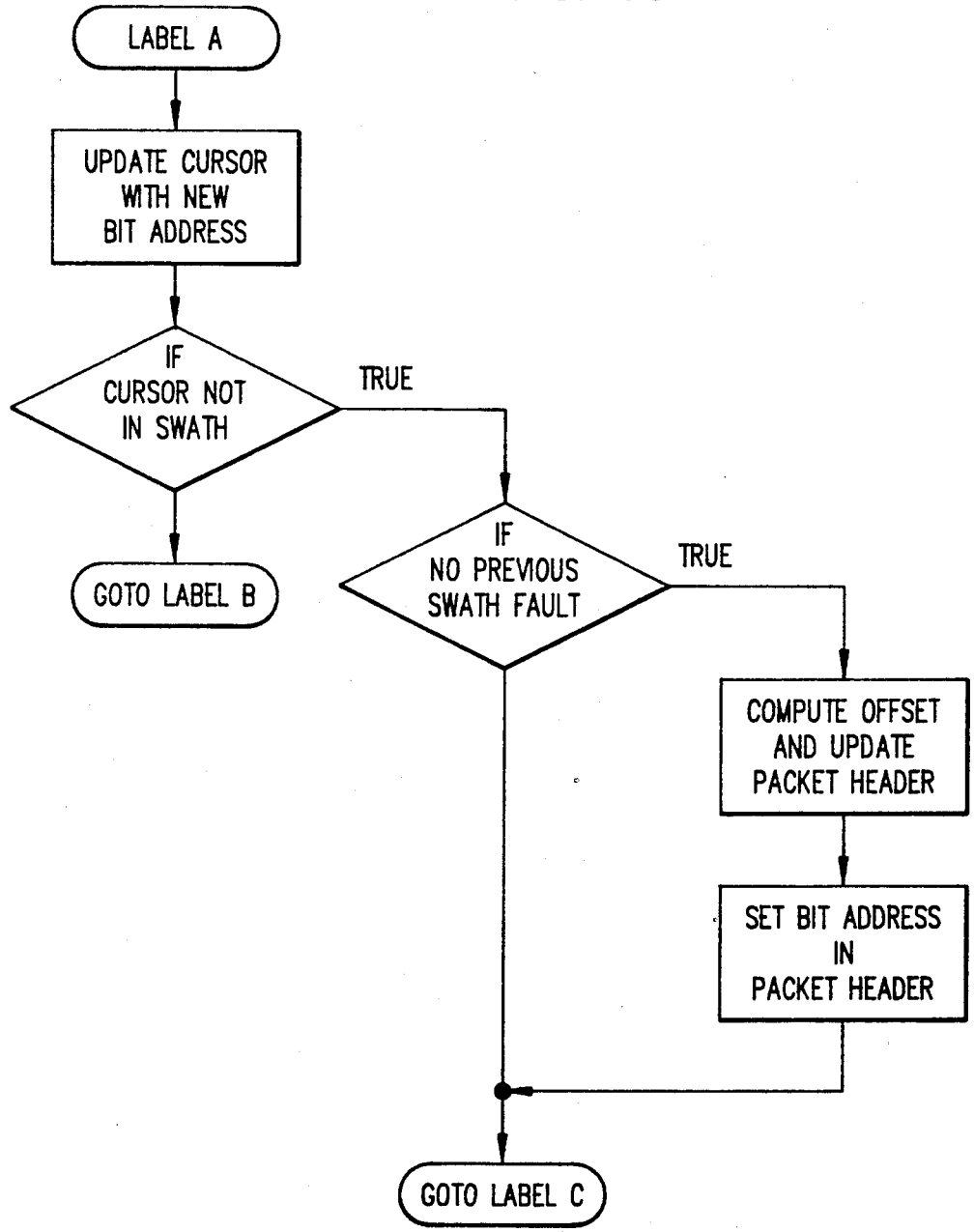

Considering this in more detail, if the character byte is a zero, the processor gets the next code byte to determine if the next byte is a null or a space. If it is a null or a space, the character is processed in the same manner as other graphic characters to be printed as previously mentioned. If the code byte is not a null or a space, it is an increment or a move command for the cursor (in the bit map) and the cursor is moved to the new location (FIG. 6c). If the cursor is now out of the swath, and no previous swath fault has been detected, the processor updates the offset and bit map restart values in the packet header. The processing of the packet is then completed.

If there has been a previous swath fault, the processor merely exits from the packet at this time since the packet header has already been updated.

In the earlier decision block (IF CURSOR NOT IN SWATH), if the cursor is still in the swath being rasterized, the processor determines (FIG. 6b) if it has reached the end of the packet data for the packet. If so, the processing of the packet is completed. If not, the processor returns to get the next character from the packet.

Returning to the determination if the next character selected from the packet is non-zero (FIG. 6a), if this is true, the processor next checks to see if the character is a space. If it is a space, it is processed in the same manner as a increment or move command as set forth in FIG. 6c. If the character is not a space, the processor gets the amount of the character escapement from the packet header and the pointer to the location of the font image for that character in the font. The processor (with hardware assistance) then processes the character into the bit map by logically combining the font data with the contents of the bit map memory.

As the microprocessor processes a packet, it must determine when the first character occurs that is not completely rasterized into the current swath. This basically means that a portion of the character extends below the active swath. The remainder of this character will need to be processed in one or more subsequent swaths. This condition of falling beyond the active swath is called a swath fault. If, as a character is processed into the bit map, it is the first fault for the packet, the processor computes the offset value to this point in the packet data and updates the offset value in the packet header. This provides an indication for the processor, when rasterizing the next swath, of where to start in the packet data. The processor also sets the restart bit address in the packet header for the character location in the bit map. If this is not the first fault for this packet in the swath rasterization process, the header information is not changed.

Whether or not the header information is changed, after processing a character into the bit map, the processor determines if the end of the packet data has been reached. If not, the processor returns to get the next character. If the end of the packet data has been reached, the packet has been fully processed.

Figure 7:
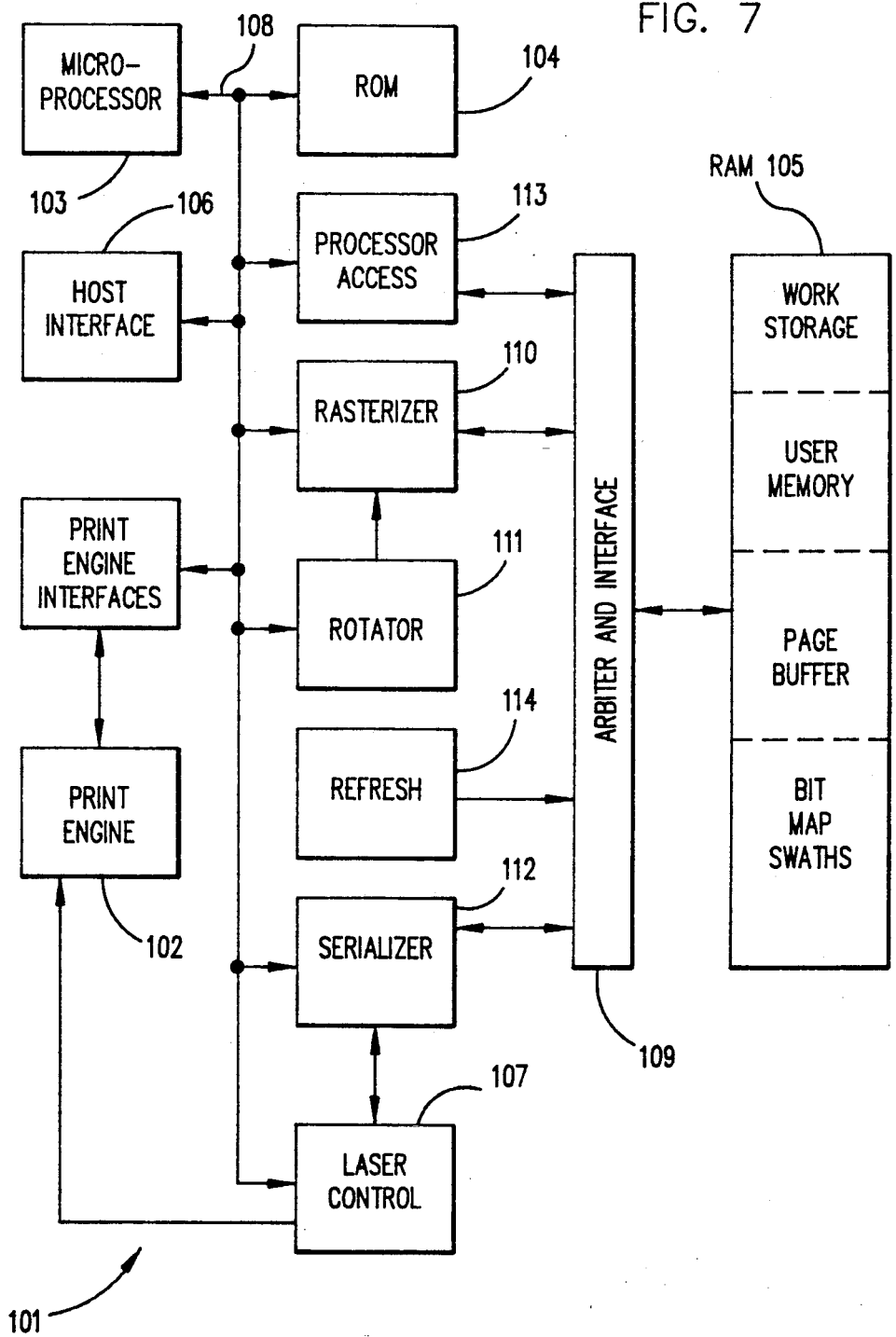
FIG. 7 is a block diagram of a printer in accordance with the present invention.

Turning now to FIG. 7, the present page printer 101 includes a microprocessor-based printer controller and a print mechanism, or print engine, 102. The printer controller includes a microprocessor 103 and associated read-only-memory (ROM) 104 as well as dynamic random access memory (RAM) 105. In the present printer, the microprocessor 103 is a Motorola 68000 microprocessor. The ROM 104 contains the instructions executed by the microprocessor 103 to cooperate with the balance of the controller to control the print engine 102 of the page printer in response to commands and data received from a host computer through a host interface 106. The print engine 102 includes, in the present instance, a laser printhead driven by a laser control 107, a photoconductor, developer material, a drive motor, and so on. The microprocessor 103 and other elements of the controller are interconnected on an address/data bus 108. The fixed ROM storage 104 includes resident fonts, and the storage connected to the bus 108 may be further augmented by optional fonts and non-volatile RAM storage.

The RAM 105 in the printer controller contains work storage, user memory, page buffer memory, and bit map memory. In the illustrated printer 101, the microprocessor 103 is assisted by hardware logic circuitry in the rasterization and serialization processes. Consequently, several resources in addition to the microprocessor 103 access the RAM 105. To coordinate this, an arbiter and interface circuit 109 interfaces between the RAM 105 and the various resources using the RAM. The additional logic hardware resources comprise a rasterizer 110 and an associated rotator 111 and a serializer 112. The rasterizer 110 and the serializer 112 are coupled to the arbiter 109, and the microprocessor 103 is coupled to the arbiter 109 through a processor access circuit 113. A RAM refresh circuit 114 also interfaces with the arbiter 109.

The arbiter 109 determines the order in which requesting resources are permitted access to read from and/or write to the RAM 105. The microprocessor 103 reads data from and writes data to RAM 105 through the processor access circuit 113 and the arbiter and interface circuit 109. The microprocessor 103 also provides raster data to the rasterizer 110, which in turn performs read-modify-write operations on the RAM 105 (primarily into the swath memory). The microprocessor 103 also controls the operation of the serializer 112, which operates through the arbiter and interface circuit 109 to read data from each bit map swath in the RAM 105 and selectively clear the swath as the data is passed to the print engine. This data is used by the laser controller 107 to modulate a laser beam sweeping the photoconductor drum. The rotator 111 is used to rotate bit map data by 90°, 180° or 270° as the data is rasterized.

The serializer 112 is enabled by the microprocessor 103, but the serializer substantially performs the task of reading data from the bit map swaths in the RAM 105 to control the printer laser. The rasterizer 110 receives raster data assembled by the microprocessor 103 but performs the logical to physical address changes discussed earlier as well as making the actual determinations of whether or not a particular bit map location is inside or outside the active swath.

Figure 8:
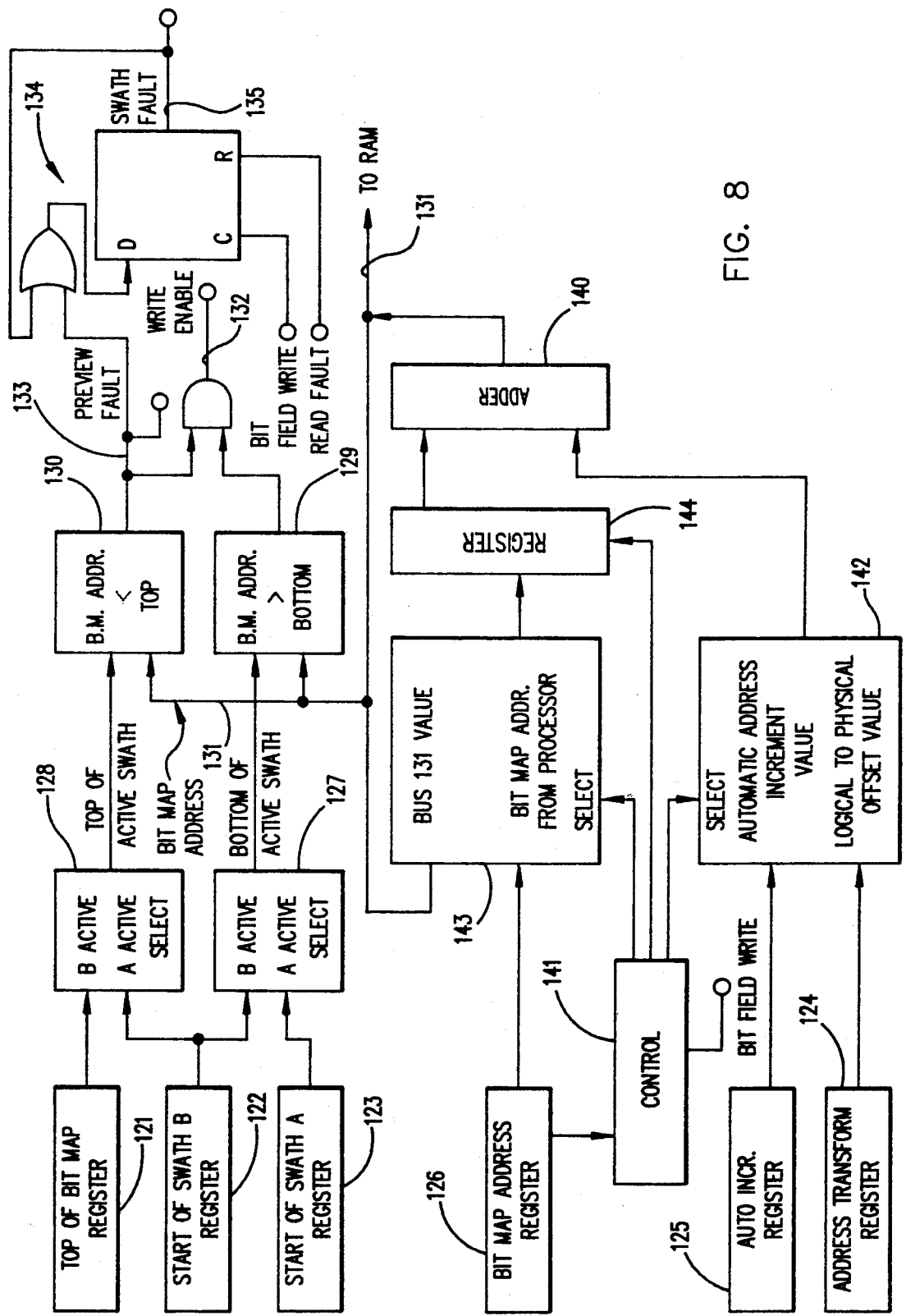
FIG. 8 is a block diagram of a portion of the rasterizer of FIG. 7.
Figure 10:
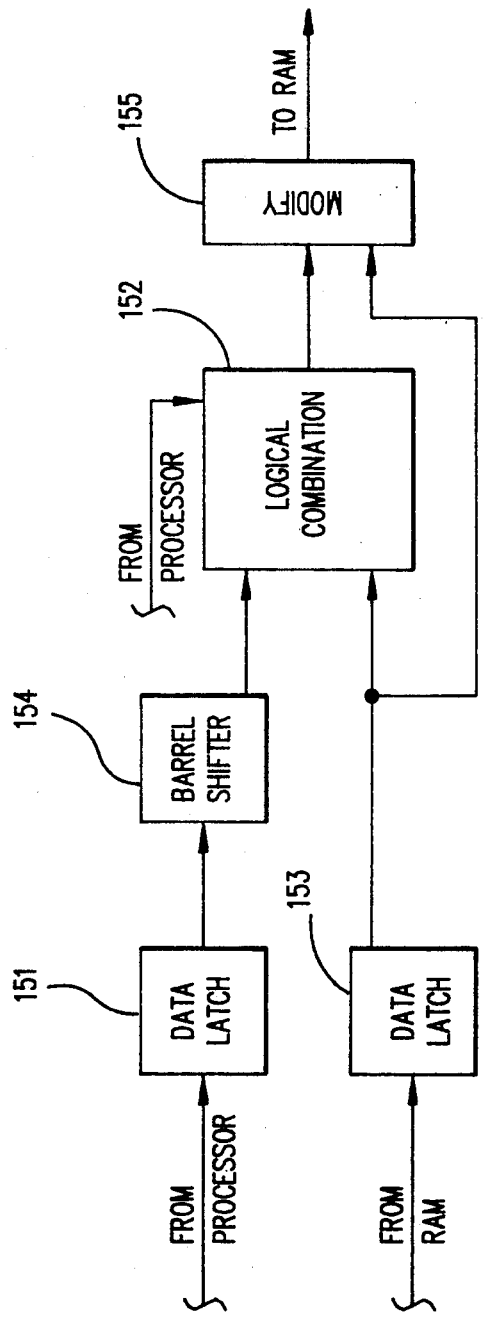
FIG. 10 is a block diagram of another portion of the rasterizer of FIG. 7.

The circuitry in the rasterizer 110 for providing the correct data and address information to the RAM 105 for rasterization, via the arbiter and interface 109, is shown in FIGS. 8 and 10. Referring first to FIG. 8, circuitry is shown for converting logical to physical bit map addresses and for indicating swath faults.

For each page to be printed, the microprocessor writes the swath boundaries for that page to the registers 121, 122 and 123.

For each swath being rasterized, the microprocessor places the address transform value in a register 124. This value is the amount of offset for the active swath from a logical bit map address on the logical page to the corresponding physical address in the bit map RAM.

For each packet of data being rasterized, the microprocessor stores an automatic increment value in a register 125. The rasterizer uses this value to increment down, for example, columns of font data without requiring the updating by the microprocessor of the data address for each bit field.

When the microprocessor writes a bit map address to the register 126 for a bit field of data, that (logical) address, translated to a physical memory address, is used for placement of the bit field of data. If no address is supplied with the data, the previous address is automatically incremented. For text, the bit map address is updated for each character, or in the case of characters having more than one column of font data, for each column of the character.

Substantially, the logic circuitry of FIG. 8 computes each physical address where a bit field is to be written to the bit map memory and provides an indication of bit map address locations falling outside the active swath. In order to determine whether or not an address fits within the active swath, the circuitry first selects the upper and lower boundaries of the active swath.

Figure 9:
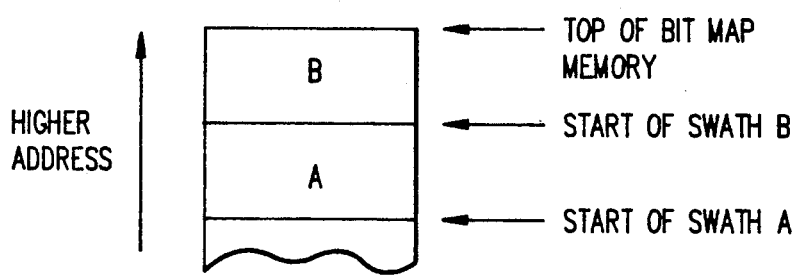
FIG. 9 is a diagrammatic illustration of swath boundaries in physical memory.

With additional reference to FIG. 9, the swath A extends from the start of swath A to the start of swath B in the bit map memory. The start of swath A is stored in the register 123, and the start of swath B is stored in the register 122. If selection circuits 127, 128 select the lines coming from these registers, respectively, the location of the bottom of the active swath (swath A in this case) is coupled to a comparator 129. Similarly, the location of the top of the active swath is coupled from the selection circuit 128 to a comparator 130. If the swath B is active, the locations of the start of swath B and the top of bit map memory define the bottom and the top of the active swath, and these values are coupled to the comparators 129 and 130. The active swath alternates between the swath A and the swath B in physical memory as a page is rasterized and serialized.

In the comparator 129, the location of the bottom of the active swath is compared to the bit map address on a bus 131. This address is the address being checked at any given moment for its location relative to the active swath. The address on the line 131 is a physical memory address, and it may be an address to which data is to be written or an address which is being checked for location relative to the active swath. This address on the bus 131 is also compared to the top of the active swath location in the comparator 130.

If the address on the bus 131 is below the top of the active swath and on or above the bottom of the active swath, the results of both comparisons in the comparator 129 and 130 are positive and a write enable signal is produced on a line 132. The address of data not rasterized in the active swath, but lying down the logical page (in the direction of printing) and yet to be rasterized, is an address above the top of the active swath. In the illustrated circuit, such a condition would be indicated by a logical low on the line 133 at the output of the comparator 130. This permits the microprocessor to preview bit map addresses to see if they will fit in the active swath. The preview fault value on the line 133 is checked by the microprocessor after a move code or an increment code in a packet to determine if there is a possibility of further packet data falling within the active swath.

The swath fault indication on the line 133 is also coupled to a latch 134 which is clocked each time a bit field is written to the bit map memory. For each write operation, any swath fault indication is coupled to an output line 135 and latched there. This fault indication remains until the microprocessor checks for a swath fault. This generally occurs at the completion of rasterization of each character in the case of a text packet. After the swath fault is checked by the microprocessor, the latch is reset.

To provide the physical address of a location in the bit map memory on the bus 131, after the bit map address has been changed in the register 126 by the microprocessor, the circuitry of FIG. 8 adds the address transform value in the register 124 to the bit map address from the register 126 in an adder 140. When an address change in the register 126 is detected by control circuitry 141, the control provides a signal to a selector circuit 143 to couple the bit map address from the register 126 to a register 144 and provides a signal to the register 144 to capture this address data. The control 141 at this time also provides a signal to the selector circuit 142 to couple the address transform value from the register 124 to the adder 140. The physical address is thereby provided to the bus 131 from the output of the adder 140. When data is written to the bit map RAM, this results in the logical combination of the data with the bit map data at the address on the bus 131.

After a data write operation, the control circuit 141 provides a signal to the selector 143 to couple the address on the bus 131 to the input of the register 144 and also provides a signal to the selector circuit 142 to provide an automatic address increment value from the register 125 to the adder 140. As a result, the address on the bus 131 changes to the value of the previously used logical address plus the automatic increment value. The control 141 provides a signal to the register 144 to capture this new address.

If at this time the control circuit 141 does not detect that the bit map address in the register 126 has been modified by the microprocessor, the control circuit provides a signal to the selector circuit 142 to couple the address transform value from the register 124 to the adder 140 for another data write operation.

The data addresses are automatically incremented in this fashion until the microprocessor modifies the bit map address in the register 126. When this occurs, as described earlier, the control circuit 141 provides a signal to the selector circuit 143 to couple the bit map address from the register 126 into the register 144. The process then proceeds as described.

The circuit of FIG. 8 permits the automatic incrementing of bit map addresses in order to speed the process of writing data to the bit map memory, such as on a word-by-word basis for a column of character font data. In this way, the bit map address is incremented and the data written to the bit map memory without the generation of a new bit map address for each data word.

In order to determine if a data address lies within the active swath, the microprocessor can provide the logical address to the register 126 and detect the state of the preview fault line 133 without providing data to be written to the bit map RAM.

The data path for writing bit map data to the bit map RAM is shown diagrammatically in FIG. 10. When data is to be written to the bit map memory, the data itself, such as font data in the form of a data word is written into a latch 151. The data is logically combined with the existing contents of the bit map memory in circuitry 152, and the combined data is written to the bit map memory. The logical combination of the data in the case of text data is a logical OR operation, which substantially overlays the new character data onto whatever was already in the bit map memory. Thus, for text packets, the data in the packet is logically OR'd with the bit map data. Other packet types, such as packets of image data in raster form, include a packet header field specifying the logical operation to be performed by the circuitry 152.

Figure 11:
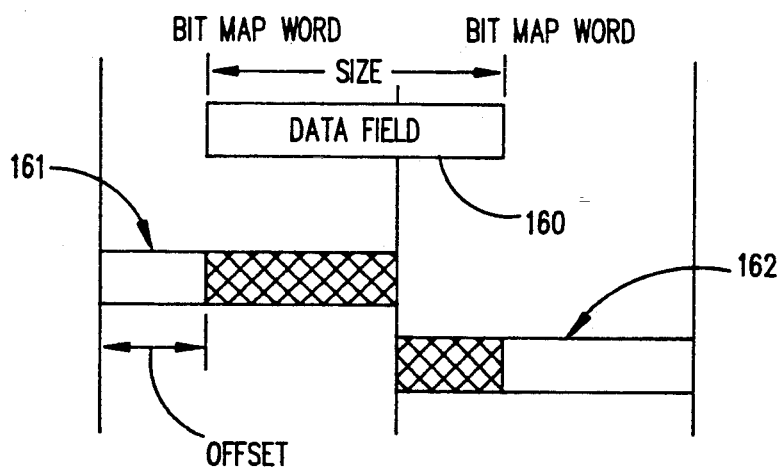
FIG. 11 is a diagrammatic illustration of the relationship of a data field to bit map memory byte boundaries.

In order to logically combine the new data with existing data from the bit map memory, the bit map RAM data is written into a data latch 153 and coupled therefrom to the circuitry 152. In order to accommodate the fact that the new data from the microprocessor typically lies across word boundaries in the bit map memory, a barrel shifter 154 is used to shift the data relative to the bytes of data readable from the bit map memory into the latch 153. The barrel shifter 154 shifts the new bit map data based upon an offset value contained in an offset portion of the bit map address provided by the microprocessor to the rasterizer. The new bit map data is logically combined with the data from the bit map memory usually in a two-cycle process and each cycle of data is masked by a modify circuit 155. For the masked portions of the data, the data read from the bit map memory into the latch 153 is rewritten to the bit map memory without alteration. FIG. 11 shows adjacent bit map words into which a data field 160 is logically combined. Based upon the value of the offset, and the size of the data field 160, the modify circuitry 155 determines the portions 161 and 162 of the bit map bytes to be masked on subsequent cycles of writing to the bit map memory.

What is claimed is:

1. A printer comprising:
   means for receiving data for an entire page to be printed, the received data being in an order other than that in which the data is to be printed;
   means for storing the received data for the page to be printed without indexing in packets of data, the data within each packet being in printing order but the packets themselves not being stored in printing order, a plurality of the packets of data containing unrasterized data; and
   means for printing the received data for the page to be printed in printing order by retrieving data from the packets of data, rasterizing unrasterized data, to assemble the data into printing order.

2. A page printer, including a print mechanism responsive to serialized bit data, for printing data received by the printer, comprising:
   means for receiving data for an entire page to be printed, the received data being in an order other than that in which the data is to be printed;
   means for storing the received data for the page to be printed without indexing in packets of data, the data within each packet being in printing order but the packets themselves not being stored in printing order, a plurality of the packets of data containing unrasterized data;
   means for rasterizing partial page bit map swaths in printing order by rasterizing data from each packet of data which is made up, at least in part, of data lying within a swath being rasterized; and
   means for serializing each swath to the print mechanism.

3. A page printer, including a print mechanism responsive to serialized bit data, for printing data received by the printer, comprising:
   means for receiving and storing data to be printed;
   means for rasterizing stored data into a series of partial page swaths to rasterize the data for a page to be printed, the swaths and bit data within swaths having logical addresses related to their positions on the page to be printed;

hardware means for translating swath bit data logical addresses to physical addresses in physical memory for each swath as it is rasterized; and means for serializing each swath to the print mechanism.

4. A page printer, including a print mechanism responsive to serialized bit data, for printing data received by the printer comprising:

means for receiving data to be printed, the received data being in an order other than that in which the data is to be printed;

means for storing the received data without indexing in packets of data, the data within each packet being in printing order but the packets themselves not being stored in printing order;

means for rasterizing partial page bit map swaths in printing order by rasterizing data from each packet of data which is made up, at least in part, of data lying within a swath being rasterized, wherein the swaths and bit data within swaths have logical addresses related to their positions on the page to be printed, and including means for selectively writing packet data representing a character lying at least in part in a swath being rasterized;

hardware means for translating swath bit data logical addresses to physical addresses in memory for bit data for each swath as it is rasterized and for only writing bit data to physical memory if the bit data lies within the swath being rasterized; and means for serializing each swath to the print mechanism.

5. A page printer, including a print mechanism responsive to serialized bit data, for printing data received by the printer, comprising:

means for receiving and storing data to be printed;

means for rasterizing stored data into a series of partial page swaths to rasterize the data for a page to be printed, the swaths and bit data within swaths having logical addresses related to their positions on the page to be printed;

means for translating swath bit data logical addresses to physical addresses in physical memory for each swath as it is rasterized;

hardware means for indicating if a logical address, translated to a physical address, lies within a swath being rasterized; and means for serializing each swath to the print mechanism.

6. A page printer, including a print mechanism responsive to serialized data, for printing data received by the printer comprising:

means for receiving and storing data to be printed;

means for converting received and stored data to be printed into fields of bit data, each field having an associated bit map address;

a programmed microprocessor operable to write a first field of bit data to a first storage location and its associated bit map address to a second storage location;

hardware means for combining the first field of bit data into a bit map memory at a location defined by the bit map address associated with the first field;

hardware means for incrementing the bit map address in the second storage location in response to the programmed microprocessor writing a subsequent field of bit data to the first storage location without writing an associated bit map address to the second storage location, the hardware means combining the second field of bit data into the bit map memory at the incremented bit map address stored in the second storage location; and means for serializing bit data in the bit map memory to the print mechanism.

* * * * *